(12) United States Patent
Vempati et al.

(10) Patent No.: US 9,319,377 B2
(45) Date of Patent: Apr. 19, 2016

(54) AUTO-SPLIT DNS

(75) Inventors: Ramprasad Vempati, Bangalore (IN); Varaprasad Amaraneni, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 455 days.

(21) Appl. No.: 13/282,291

(22) Filed: Oct. 26, 2011

(65) Prior Publication Data

US 2013/0111040 A1     May 2, 2013

(51) Int. Cl.
    *G06F 15/16*     (2006.01)
    *H04L 29/12*     (2006.01)
    *H04L 29/06*     (2006.01)

(52) U.S. Cl.
    CPC .......... *H04L 61/1511* (2013.01); *H04L 63/029* (2013.01); *H04L 61/2015* (2013.01)

(58) Field of Classification Search
None
See application file for complete search history.

(56) References Cited

U.S. PATENT DOCUMENTS

| | | | |
|---|---|---|---|
| 7,032,010 B1 | 4/2006 | Swildens et al. | |
| 7,873,993 B2 * | 1/2011 | King | 726/11 |
| 8,005,981 B2 | 8/2011 | Tuck et al. | |
| 8,423,631 B1 * | 4/2013 | Mower et al. | 709/223 |
| 8,443,435 B1 * | 5/2013 | Schroeder | 726/15 |
| 8,560,833 B2 * | 10/2013 | Kumar et al. | 713/151 |
| 8,769,057 B1 | 7/2014 | Breau et al. | |
| 2001/0047429 A1 * | 11/2001 | Seng et al. | 709/245 |
| 2002/0103931 A1 * | 8/2002 | Mott | 709/245 |
| 2007/0094411 A1 * | 4/2007 | Mullane et al. | 709/245 |
| 2007/0104197 A1 * | 5/2007 | King | 370/392 |
| 2009/0165099 A1 | 6/2009 | Eldar et al. | |
| 2010/0269174 A1 | 10/2010 | Shelest | |
| 2012/0110320 A1 * | 5/2012 | Kumar et al. | 713/151 |
| 2013/0111040 A1 * | 5/2013 | Vempati et al. | 709/227 |
| 2013/0111066 A1 * | 5/2013 | Vempati et al. | 709/245 |
| 2013/0122910 A1 * | 5/2013 | Singh et al. | 455/437 |
| 2013/0175600 A1 * | 7/2013 | Jenne et al. | 257/324 |
| 2013/0179551 A1 | 7/2013 | Li | |

OTHER PUBLICATIONS

Non-Final Office Action of Jan. 23, 2015 for U.S. Appl. No. 13/407,451, 11 pages.

* cited by examiner

*Primary Examiner* — Ranodhi Serrao

(57) ABSTRACT

Automatically configuring split-DNS operation in a remote access point (RAP) connected to a network. During RAP initialization, the RAP establishes a secure tunnel to its controller. To use this tunnel, a client must obtain an IP address from the controller using DHCP. The RAP snoops the client DHCP request, obtaining the domain name. This returned domain name is used as a target suffix or pattern for split-DNS operation. Additionally, the RAP may query DNS servers for additional domains supported, and add these domains to targets for split-DNS operation.

12 Claims, 1 Drawing Sheet

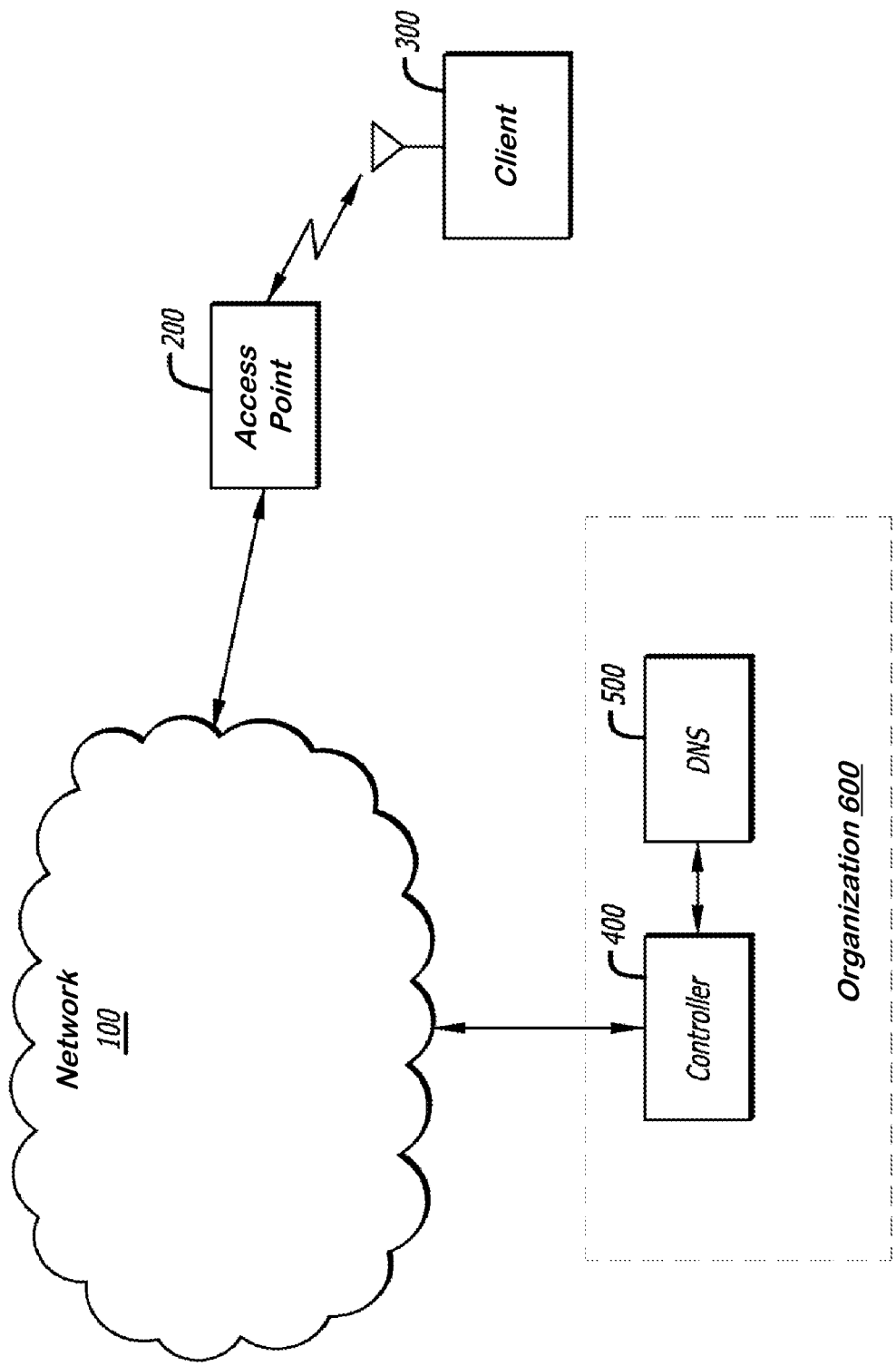

AUTO-SPLIT DNS

BACKGROUND OF THE INVENTION

The present invention relates to remote access in digital networks, and more particularly to split tunneling in remote access to networks.

Digital networks have become the backbone of many organizations and enterprises. Within an organization, networks can be secured, and provide members of the organization secure access to resources within the organization.

In many cases, members of an organization wish to access these resources securely from remote locations, such as from home, or on the road.

One approach to providing such remote access is to provide members of he organization with remote access points (RAPs). These RAPs provide a secure connection to organization resources. The RAP is connected to a public network. In operation, the RAP establishes a secure tunnel over the public network which is terminated inside the organization firewall.

The RAP provides wired or wireless access through the tunnel, providing secure access to organization resources by routing all client network activity through the tunnel and through the infrastructure located at the organization.

But routing all client network activity through the tunnel and through the organization has performance penalties.

As an example, consider a RAP user at home, connected to the organization infrastructure. When the client connects to an organization e-mail server, that connection goes through the tunnel established by the RAP to the e-mail server in the organization.

But when the client uses a web browser to visit a news website such as cnn.com or slashdot.org, that request and subsequent traffic are also directed through the tunnel and through the organization's infrastructure.

To alleviate this issue the concept of a split-tunnel has developed. In split-tunnel operation, traffic to a set of addresses and/or services are directed through the tunnel, while traffic to other addresses and/or services are routed directly to the network the RAP is attached to. So in the case of a split-tunnel, when the RAP client accesses slashdot.org, that request is not sent through the secure tunnel, but directly out to the Internet.

One implementation of the split-tunnel mechanism is DNS based. As is known in the art, the DNS mechanism maps domain names, such as "slashdot.org" to an IP address, such as "216.34.181.45." The split-tunnel mechanism recognizes a particular domain suffix, or pattern-matches part of the domain name, and routes matching DNS requests through the tunnel.

As an example, if an organization's domain name is "acme-sprockets.com," the split-tunnel mechanism would route all DNS requests containing "acmesprockets" or the suffix "acmesprockets.com" through the tunnel to the organization's DNS for resolution to an IP address.

Other DNS requests not matching the pattern are routed to the DNS associated with the Internet connection. DNS lookups through the tunnel which fail may also be re-routed to the DNS associated with the Internet connection.

In the example given, a DNS request for "mail.acmesprockets.com" will be routed through the tunnel, while a DNS request for "groklaw.net" will be routed to the DNS associated with the Internet connection.

A problem exists, however, in configuring the operation of the split-tunnel. The set of suffixes or pattern matches to be used in split-tunnel operation must be configured and managed for each and every RAP in use.

What is needed is a better way to manage and update split-tunnel DNS configurations.

BRIEF DESCRIPTION OF THE DRAWINGS

The invention may be best understood by referring to the following description and accompanying drawings that are used to illustrate embodiments of the invention in which:

FIG. 1 shows devices in a network.

DETAILED DESCRIPTION

Embodiments of the invention relate to methods of configuring split-tunnel DNS operation in a remote access point (RAP). A RAP learns DNS suffixes for split-tunnel DNS operation through DHCP options in the client exchange during setup of the secure tunnel. Once the host DNS server is known, that DNS server may be queried for other suffixes or patterns to be routed over the tunnel.

According to the present invention and as shown in FIG. 1, client 300 connects through remote access point (RAP) 200 to network 100. Also on network 100 is organization controller 400 and organization DNS server 500. RAP 200 may also be a remotely located switch, or a remotely located controller.

As is understood in the art, RAP 200 is a purpose-built digital device containing a processor, a memory hierarchy, and input/output interfaces. Such devices typically operate under the control of an operating system such as Linux, running specific programs to provide for access point operation. A MIPS-class processor such as one from Cavium or NetLogic-RMI may be used. Wired network interfaces typically are IEEE 802.3 Ethernet interfaces. Wireless interfaces are typically IEEE 802.11 WiFi interfaces. The memory hierarchy of the device typically contains fast read-write memory for holding programs and data during device operation, and a hierarch of persistent memory such as ROM, EPROM, and Flash for holding instructions and data needed for device startup, and a file system for device operation.

Similarly, organization controller 400 and DNS server 500 are also purpose-built digital devices, containing a processor, a memory hierarchy, and input/output interfaces. Such devices typically operate under the control of an operating system such as Linux, running specific programs to provide for access point operation. A MIPS-class processor such as one from Cavium or NetLogic-RMI may be used. Wired network interfaces typically are IEEE 802.3 Ethernet interfaces. Wireless interfaces are typically IEEE 802.11 WiFi interfaces. The memory hierarchy of the device typically contains fast read-write memory for holding programs and data during device operation, and a hierarch of persistent memory such as ROM, EPROM, and Flash for holding instructions and data needed for device startup, and a file system for device operation.

While DNS server 500 is shown as a separate device attached to the network, it may also be implemented as a process running for example on controller 400, or on another suitable network device such as a server, switch, or router.

Client 300 is also a purpose-built digital device such as a laptop, notebook computer, tablet, handheld device, smartphone, or other digital device containing processor, memory hierarchy, and input/output interfaces such as a display, speaker, microphone, and radios typically for 802.11 Wi-Fi communications.

For clarity, FIG. 1 does not show other typical network devices such as switches, routers, firewalls, and the like which are well understood by the art.

According to the present invention, RAP 200 is connected to network 100. This connection may be direct, or may be through a device such as a cable modem, DLS modem, wireless bridge, or through other similar mechanism.

As part of initialization, RAP 200 uses the DNS server associated with internet 100 (not shown) to look up the IP address of organization controller 400. Assume for this example the organization is "acmesprockets.com." Rap 200 issues a DNS request for "acmesprockets.com" which returns an IP address, for example "212.77.8.1". In an alternate embodiment, RAP 200 may be configured with this IP address, eliminating the need to perform the initial DNS lookup.

Rap 200 uses this address to establish a connection such as a secure tunnel to organization controller 400, which terminates the secure tunnel from RAP 200 and provides client access to services inside the organization 600, including DNS server 500.

For client 300 to use services inside the organization 600, it must first obtain an IP address, which it does using DHCP. Client 300 issues a DHCP request across the tunnel to controller 400. DHCP is described for example in RFC 2131 for IPv4 networks, and in RFC 3315 and RFC 3633 for IPv6 networks.

According to the present invention, when client 300 makes this DHCP request to controller 400, RAP 200 snoops the DHCP request and response. RAP 200 insures the DHCP request uses DHCP options as defined in RFC 2132 to request the domain name as well as the address of DNS server 500. In the example shown, assume the address of DNS server 500 returned in DHCP options for the DHCP Offer returned to client 300 is "10.1.1.50" and the domain name is "acmesprockets.com". Note that multiple DNS server addresses may be returned.

RAP 200 snoops the DHCP Offer returned to client 300 and initializes its suffix for split-tunnel DNS operation using the domain name returned by the DHCP options, in this case "acmesprockets.com".

In operation, client DNS requests matching the pattern or suffix "acmesprockets.com" are sent to DNS server 500. Client DNS requests which do not match the pattern or suffix are sent to the DNS associated with network 100.

In an embodiment of the invention, a client DNS request may have the pattern or suffix appended and a DNS lookup sent to DNS server 500; if this DNS request fails, then the initial client DNS request is sent to the DNS for network 100. This allows, as an example, the client to issue a browser request for "intranet" and have a DNS request sent to DNS server 500 as "intranet.acmesprockets.com".

Optionally this appending and lookup step may be performed only when the client request does not contain a domain delimiter such as "." so that only requests such as "intranet" or "mailserver" will have the suffix ".acmesprockets.com" appended and looked up through DNS server 500; requests such as "cnn.com" or "slashdot.org" will not have this step performed.

In an embodiment of the invention, once the address of DNS server 500 is known, DNS server 500 can be queried by RAP 200 for other domains and subdomains also available. As an example, while the primary domain served by controller 400 is "acmesprockets.com" it may also serve the domains "sprocketsbymail.com" and "elitesprocketsbyfred.com". By querying DNS server 500, RAP 200 can obtain these domain names as well, and add them to the list of suffixes to be recognized in split-tunnel operation.

It should be understood that since the initial DHCP DISCOVER request sent by client 300 to controller 400 contains the hardware (MAC) address of client 300, the IP address allocated to client 300 for its secure tunnel is allocated based on the MAC address of client 300. This allows for split-tunnel operation to be set up on a per-client basis. As an example, a client MAC recognized as a member of the engineering staff would be assigned an address providing access to engineering services such as servers and the like, while not providing access to finance or operations servers.

The present invention may be realized in hardware, software, or a combination of hardware and software. A typical combination of hardware and software may be a network server or access point with a computer program that, when being loaded and executed, controls aspects of the host device such that it carries out the methods described herein.

The present invention also may be embedded in nontransitory fashion in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

The invention claimed is:

1. A computer-implemented method, comprising:
   receiving, by a computing device, a dynamic host configuration protocol (DHCP) request message;
   determining whether the DHCP request message enables a DHCP response message to include a response message domain name;
   receiving a DHCP response message, wherein a DHCP response message is associated with a domain name service (DNS) server and a response message domain name;
   determining the response message domain name associated with the DHCP response message, wherein determining includes evaluating content of the DHCP response message;
   receiving a DNS request message, wherein a DNS request message is associated with a request message domain name;
   generating a combined domain name, wherein generating includes appending the response message domain name associated with the DHCP response message to the request message domain name associated with the DNS request message; and
   routing the DNS request message using the combined domain name, wherein the DNS request message is routed to a DNS server associated with the DHCP response message.

2. The method of claim 1, further comprising:
   receiving an indication that the DNS request message routing failed; and
   routing the DNS request message to a different DNS server using the request message domain name.

3. The method of claim 1, further comprising:
   determining a client associated with the DHCP request message, wherein determining includes evaluating content of the DHCP request message.

4. The method of claim 3, wherein the DNS request message is routed to a DNS server associated with both the DHCP response message and the client associated with the DHCP request message.

5. A computer-implemented system, the system comprising:
   one or more processors;
   a display;
   an input device; and
   one or more non-transitory computer-readable storage mediums containing instructions configured to cause the one or more processors to perform operations including:
      receiving a dynamic host configuration protocol (DHCP) request message;
      determining whether the DHCP request message enables a DHCP response message to include a response message domain name;
      receiving a DHCP response message, wherein a DHCP response message is associated with a domain name service (DNS) server and a response message domain name;
      determining the response message domain name associated with the DHCP response message, wherein determining includes evaluating content of the DHCP response message;
      receiving a DNS request message, wherein a DNS request message is associated with a request message domain name;
      generating a combined domain name, wherein generating includes appending the response message domain name associated with the DHCP response message to the request message domain name associated with the DNS request message; and
      routing the DNS request message using the combined domain name, wherein the DNS request message is routed to a DNS server associated with the DHCP response message.

6. The system of claim 5, further comprising instructions configured to cause the one or more processors to perform operations including:
   receiving an indication that the DNS request message routing failed; and
   routing the DNS request message to a different DNS server using the request message domain name.

7. The system of claim 5, further comprising instructions configured to cause the one or more processors to perform operations including:
   determining a client associated with the DHCP request message, wherein determining includes evaluating content of the DHCP request message.

8. The system of claim 7, wherein the DNS request message is routed to a DNS server associated with both the DHCP response message and the client associated with the DHCP request message.

9. A computer-program product tangibly embodied in a non-transitory machine-readable storage medium, including instructions configured to cause a data processing apparatus to:
   receive a dynamic host configuration protocol (DHCP) request message;
   determine whether the DHCP request message enables a DHCP response message to include a response message domain name;
   receive a DHCP response message, wherein a DHCP response message is associated with a domain name service (DNS) server and a response message domain name;
   determine the response message domain name associated with the DHCP response message, wherein determining includes evaluating content of the DHCP response message;
   receive a DNS request message, wherein a DNS request message is associated with a request message domain name;
   generate a combined domain name, wherein generating includes appending the response message domain name associated with the DHCP response message to the request message domain name associated with the DNS request message; and
   route the DNS request message using the combined domain name, wherein the DNS request message is routed to a DNS server associated with the DHCP response message.

10. The computer-program product of claim 9, further comprising instructions configured to cause the data processing apparatus to:
    receive an indication that the DNS request message routing failed; and
    route the DNS request message to a different DNS server using the request message domain name.

11. The computer-program product of claim 9, further comprising instructions configured to cause the data processing apparatus to:
    determine a client associated with the DHCP request message, wherein determining includes evaluating content of the DHCP request message.

12. The computer-program product of claim 11, wherein the DNS request message is routed to a DNS server associated with both the DHCP response message and the client associated with the DHCP request message.

* * * * *